(12) United States Patent
Wu et al.

(10) Patent No.: US 11,966,107 B2
(45) Date of Patent: Apr. 23, 2024

(54) ANTI-PEEP DISPLAY DEVICE AND ANTI-PEEP METHOD

(71) Applicant: CHAMP VISION DISPLAY INC., Miao-Li County (TW)

(72) Inventors: Chung-Hao Wu, Miao-Li County (TW); Hsin-Hung Lee, Miao-Li County (TW); Chin-Ku Liu, Miao-Li County (TW); Chun-Chien Liao, Miao-Li County (TW); Wei-Jhe Chien, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/209,494

(22) Filed: Jun. 14, 2023

(65) Prior Publication Data

US 2023/0408854 A1 Dec. 21, 2023

(30) Foreign Application Priority Data

Jun. 15, 2022 (TW) .................................. 111122188

(51) Int. Cl.
*G02F 1/13* (2006.01)
*F21V 8/00* (2006.01)
*G02F 1/1335* (2006.01)
*G02F 1/13357* (2006.01)
*G02F 1/29* (2006.01)

(52) U.S. Cl.
CPC ......... *G02F 1/1323* (2013.01); *G02B 6/0023* (2013.01); *G02B 6/0055* (2013.01); *G02F 1/1313* (2013.01); *G02F 1/133605* (2013.01); *G02F 1/133627* (2021.01);
(Continued)

(58) Field of Classification Search
CPC ..... G02F 1/1323; G02F 1/133627; G02F 1/29
See application file for complete search history.

(56) References Cited

U.S. PATENT DOCUMENTS 9,400,347 B2 7/2016 Sugiyama et al.
2019/0163015 A1 5/2019 Ko et al.
(Continued)

FOREIGN PATENT DOCUMENTS

CN 105911746 A 8/2016
CN 107807472 B 6/2020
(Continued)

*Primary Examiner* — Keith G. Delahoussaye (57) ABSTRACT

An anti-peep display device includes a display module and an anti-peep module disposed on the display module. The anti-peep module includes the following features. The first light incident surface faces the display surface, the second and third light incident surfaces are located on opposite sides of the first light incident surface, the first condensing portion is disposed corresponding to the second light incident surface and the first light source, the second condensing portion is disposed corresponding to the third light incident surface and the second light source, the first and second condensing portions convert beams of the first and second light sources into anti-peep beams with a beam angle less than 10 degrees, and the optical microstructures reflect the anti-peep beams and exit the anti-peep beams from the light guide plate. The present invention also provides an anti-peep method applicable to the anti-peep display device.

13 Claims, 11 Drawing Sheets

(52) U.S. Cl.
CPC .............. *G02F 1/29* (2013.01); *G02B 6/0036* (2013.01); *G02F 1/133603* (2013.01)

(56) References Cited

U.S. PATENT DOCUMENTS

| | | | | |
|---|---|---|---|---|
| 2020/0005718 A1* | 1/2020 | Fattal | ................... | G09G 3/3406 |
| 2022/0413203 A1* | 12/2022 | Fattal | ................... | G02B 5/1819 |
| 2023/0101373 A1* | 3/2023 | Kim | ...................... | G02F 1/1323 |
| | | | | 362/613 |
| 2023/0288753 A1* | 9/2023 | Shiau | ................ | G02F 1/133607 |
| 2024/0019623 A1* | 1/2024 | Xu | ....................... | G02B 6/0023 |

FOREIGN PATENT DOCUMENTS

| | | |
|---|---|---|
| TW | 201626007 A | 7/2016 |
| TW | M623305 U | 2/2022 |
| TW | I764775 B | 5/2022 |

* cited by examiner

ANTI-PEEP DISPLAY DEVICE AND ANTI-PEEP METHOD

CROSS-REFERENCE TO RELATED APPLICATION

This application claims the priority benefit of Taiwan application (No. 111122188), filed on Jun. 15, 2022. The entirety of the above-mentioned patent application is hereby incorporated by reference herein and made a part of this specification.

FIELD OF THE INVENTION

The present invention relates to a display device, and more particularly to an anti-peep display device and an anti-peep method applicable to the anti-peep display device.

BACKGROUND OF THE INVENTION

Many electronic products in daily life, such as notebook computers, monitors, tablet computers, smart phones and televisions, are equipped with screens. Because the electronic products may be widely used in work or public places, many users may install an anti-peep film on the screen to prevent the information displayed on the screen from being peeped by others. Specifically, the anti-peep film can block the light with a larger angle emitted from the screen, thereby narrowing the viewing angle of the screen to achieve the anti-peep effect.

However, because the anti-peep film blocks the light emitted from the screen, the luminance of the screen may be dimmed, the contrast and sharpness may be reduced, and therefore the image quality is reduced and the viewing experience is affected. In addition, the conventional anti-peep film itself cannot determine whether the screen needs anti-peep. Therefore, the anti-peep film can only be removed manually when the user does not need the anti-peep function temporarily, so the conventional anti-peep film is inconvenience for use.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides an anti-peep display device to provide anti-peep function and maintain image quality.

The present invention provides an anti-peep method to improve the convenience of use of an anti-peep module.

Other advantages and objectives of the invention may be further illustrated by the technical features broadly embodied and described as follows.

In order to achieve one or a portion of or all of the objectives or other objectives, the anti-peep display device provided by the present invention includes a display module and an anti-peep module. The display module has a display surface. The anti-peep module is disposed on the display surface and includes a light guide assembly, a first light source and a second light source. The light guide assembly includes a light guide plate, a first condensing portion and a second condensing portion. The light guide plate is disposed on the display surface. The light guide plate has a first light incident surface, a second light incident surface, a third light incident surface and a light exit surface. The first light incident surface faces the display surface and is opposite to the light exit surface. The second light incident surface and the third light incident surface are located between the first light incident surface and the light exit surface and are disposed on opposite sides. The first light incident surface is formed with a plurality of optical microstructures. The first condensing portion is disposed corresponding to the second light incident surface. The second concentrating portion is disposed corresponding to the third light incident surface. The first light source and the second light source are respectively disposed corresponding to the first condensing portion and the second condensing portion. The first condensing portion and the second condensing portion are configured to convert a plurality of beams provided by the first light source and the second light source into a plurality of anti-peep beams with a beam angle less than 10 degrees. The optical microstructures are configured to reflect the anti-peep beams to the light exit surface, the anti-peep beams are then emitted from the light exit surface, and a light-emitting angle of the anti-peep beams from the light exit surface is between 20 and 60 degrees.

In order to achieve one or a portion of or all of the objectives or other objectives, the present invention provides an anti-peep method applicable to the aforementioned anti-peep display device. The anti-peep method includes: configuring the control module to determine whether to turn on the anti-peep module according to an image frame displayed on the display module, wherein the control module drives the anti-peep module to generate the anti-peep beams when the image frame comprises an anti-peep zone, and the control module turns off the anti-peep module when the image frame does not comprise the anti-peep zone.

In the embodiments of the present invention, the anti-peep module of the anti-peep display device adopts the first light source and the second light source to generate the beams, and adopts the first condensing portion and the second condensing portion to convert the beams into the anti-peep beams, respectively. Furthermore, the anti-peep beams overlap with a part of the display beam (e.g., the display beam with a large light-emitting angle) generated by the display surface, and the luminance of the anti-peep beams is greater than that of the display beam. Therefore, the display beam with a large light-emitting angle cannot be clearly seen due to the influence of the anti-peep beams, thereby providing the anti-peep function. In addition, the anti-peep display device of the present invention achieves the anti-peep function by the anti-peep beams overlapping the display beam with a large light-emitting angle; thus, the luminance of the display surface will not be reduced, and therefore the image quality of the anti-peep display device can be maintained. In the anti-peep method of the present invention, the control module can automatically determine whether to turn on the anti-peep module according to the image frame displayed on the display module, so the convenience of use of the anti-peep module can be improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
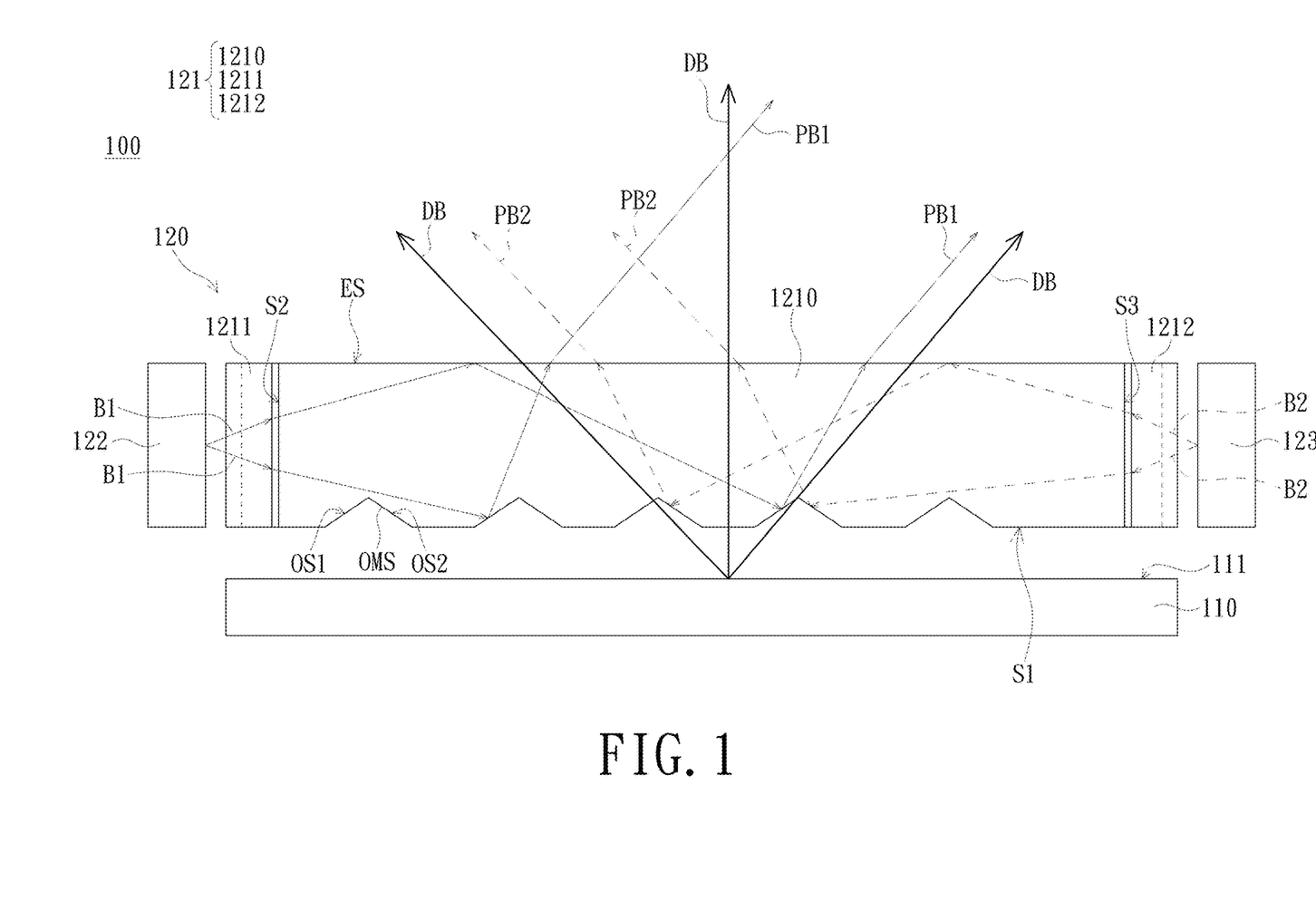
FIG. 1 is a schematic cross-sectional view of an anti-peep display device according to an embodiment of the present invention.
Figure 2:
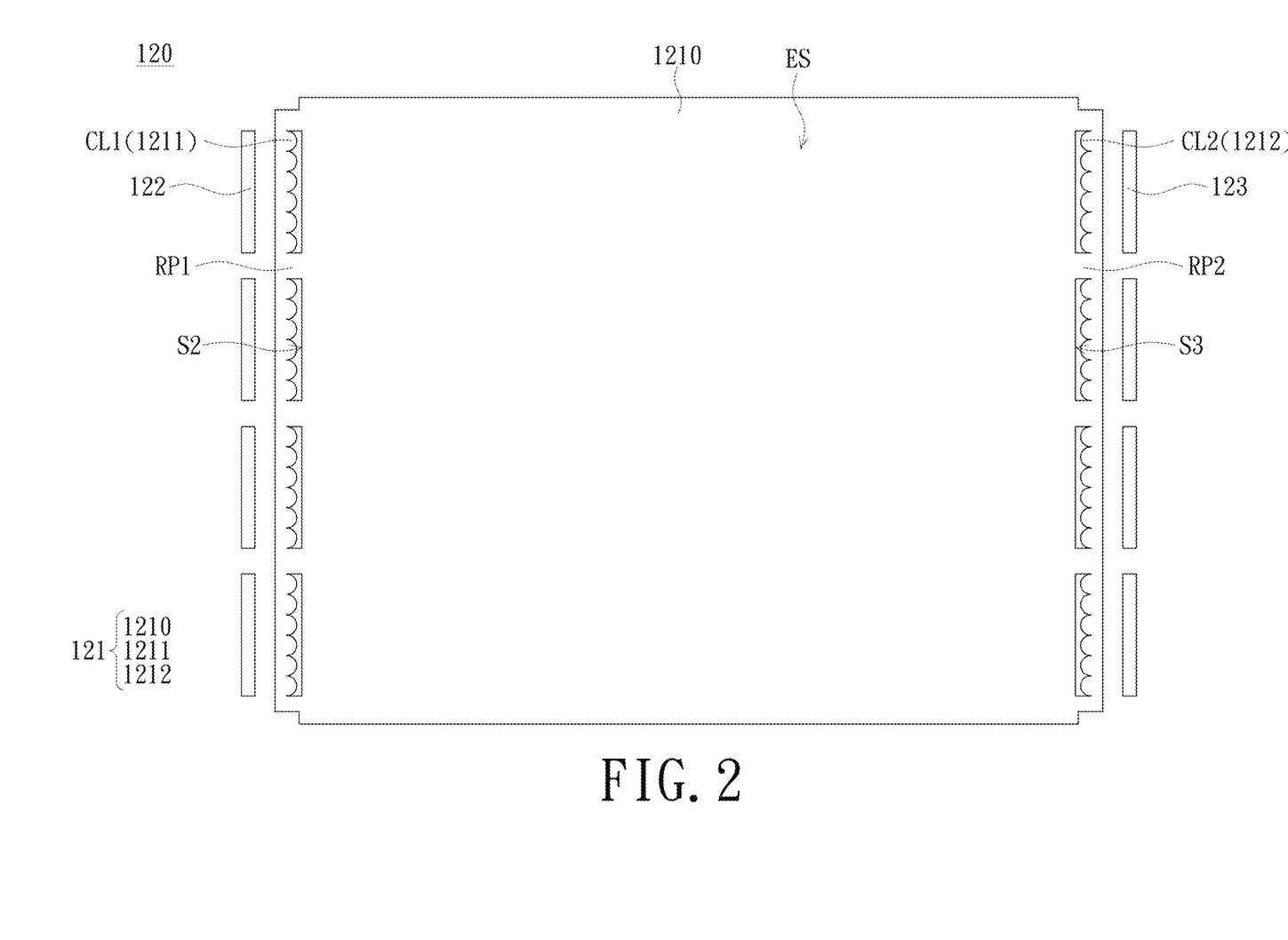
FIG. 2 is a schematic top view of an anti-peep module of the anti-peep display device of FIG. 1.
Figure 3:
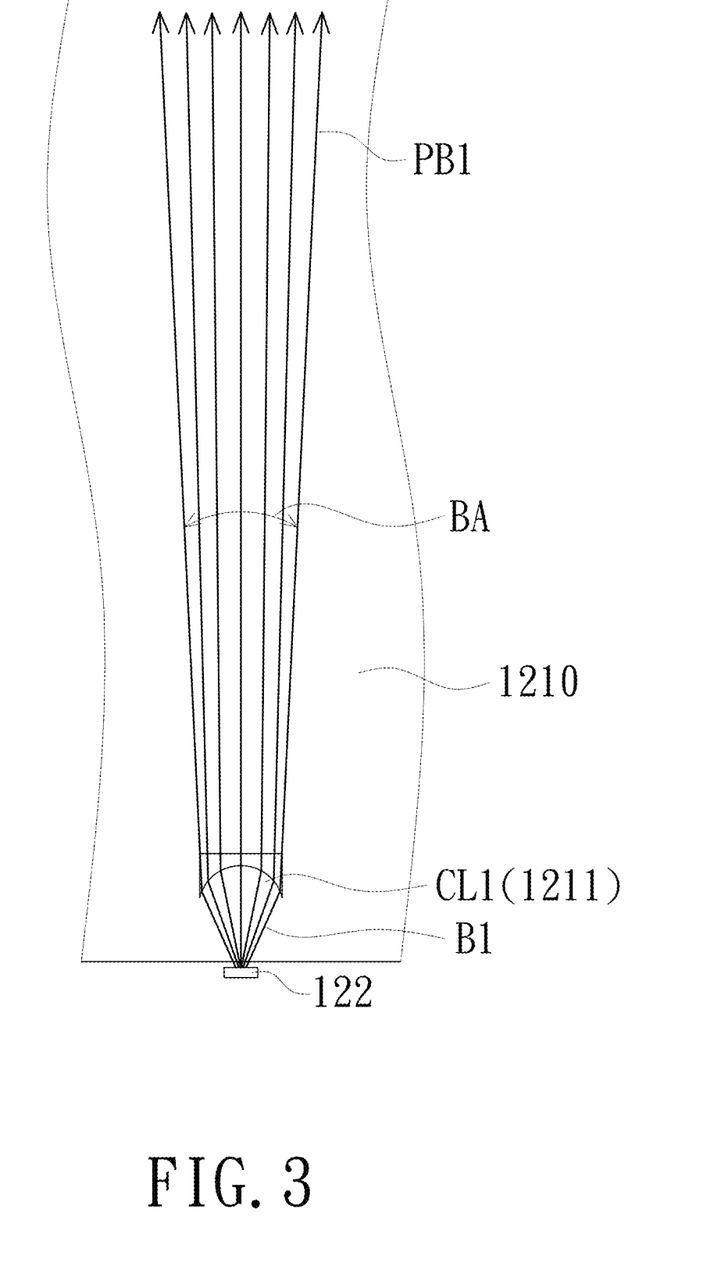
FIG. 3 is a schematic view illustrating a first condensing portion in FIG. 1 converting a beam into an anti-peep beam.

FIG. 1 is a schematic cross-sectional view of an anti-peep display device according to an embodiment of the present invention. FIG. 2 is a schematic top view of an anti-peep module of the anti-peep display device of FIG. 1. FIG. 3 is a schematic view illustrating a first condensing portion in FIG. 1 converting a beam into an anti-peep beam. Referring to FIGS. 1 and 2 first, the anti-peep display device 100 includes a display module 110 and an anti-peep module 120. The display module 110 has a display surface 111 (shown in FIG. 1). The anti-peep module 120 is disposed on the display surface 111. The anti-peep module 120 includes a light guide assembly 121, a first light source 122 and a second light source 123. The light guide assembly 121 includes a light guide plate 1210, a first condensing portion 1211 and a second condensing portion 1212. The light guide plate 1210 is disposed on the display surface 111. The light guide plate 1210 has a first light incident surface S1 (shown in FIG. 1), a second light incident surface S2, a third light incident surface S3 and a light exit surface ES. The first light incident surface S1 faces the display surface 111 and is opposite to the light exit surface ES. The second light incident surface S2 and the third light incident surface S3 are located between the first light incident surface S1 and the light exit surface ES and are disposed on opposite sides. The first light incident surface S1 is formed with a plurality of optical microstructures OMS (shown in FIG. 1). The first condensing portion 1211 is disposed corresponding to the second light incident surface S2, and the second condensing portion 1212 is disposed corresponding to the third light incident surface S3. The first light source 122 is disposed corresponding to the first condensing portion 1211, and the second light source 123 is disposed corresponding to the second condensing portion 1212. Referring to FIGS. 1 and 3, the first condensing portion 1211 and the second condensing portion 1212 are configured to convert a plurality of beams provided by the first light source 122 and the second light source 123 into a plurality of anti-peep beams with a beam angle BA (show in FIG. 3) less than 10 degrees. For example, the first condensing portion 1211 converts the beam B1 provided by the first light source 122 into an anti-peep beam PB1, and the second condensing portion 1212 converts the beam B2 provided by the second light source 123 into an anti-peep beam PB2. The optical microstructure OMS is configured to reflect the anti-peep beams PB1 and PB2 to the light exit surface ES, and then the anti-peep beams PB1 and PB2 are emitted from the light exit surface ES, wherein the light-emitting angle of the anti-peep beams PB1 and PB2 from the light exit surface ES is between 20 and 60 degrees (the aforementioned light-emitting angle refers to an angle relative to the normal direction of the light exit surface ES).

Refer to FIGS. 1 and 2 again. The display surface 111 of the display module 110 can generate a display beam DB to present an image frame. In this embodiment, the display module 110 comprises a liquid crystal display panel and a light source module disposed below the liquid crystal display panel, and the display surface 111 is, for example, a screen of the aforementioned liquid crystal display panel. However, in one embodiment, the display module 110 may be a light emitting diode (LED) display panel, an organic light emitting diode (OLED) display panel, or the like, and the present invention does not limit the specific type of the display module 110.

Figure 4:
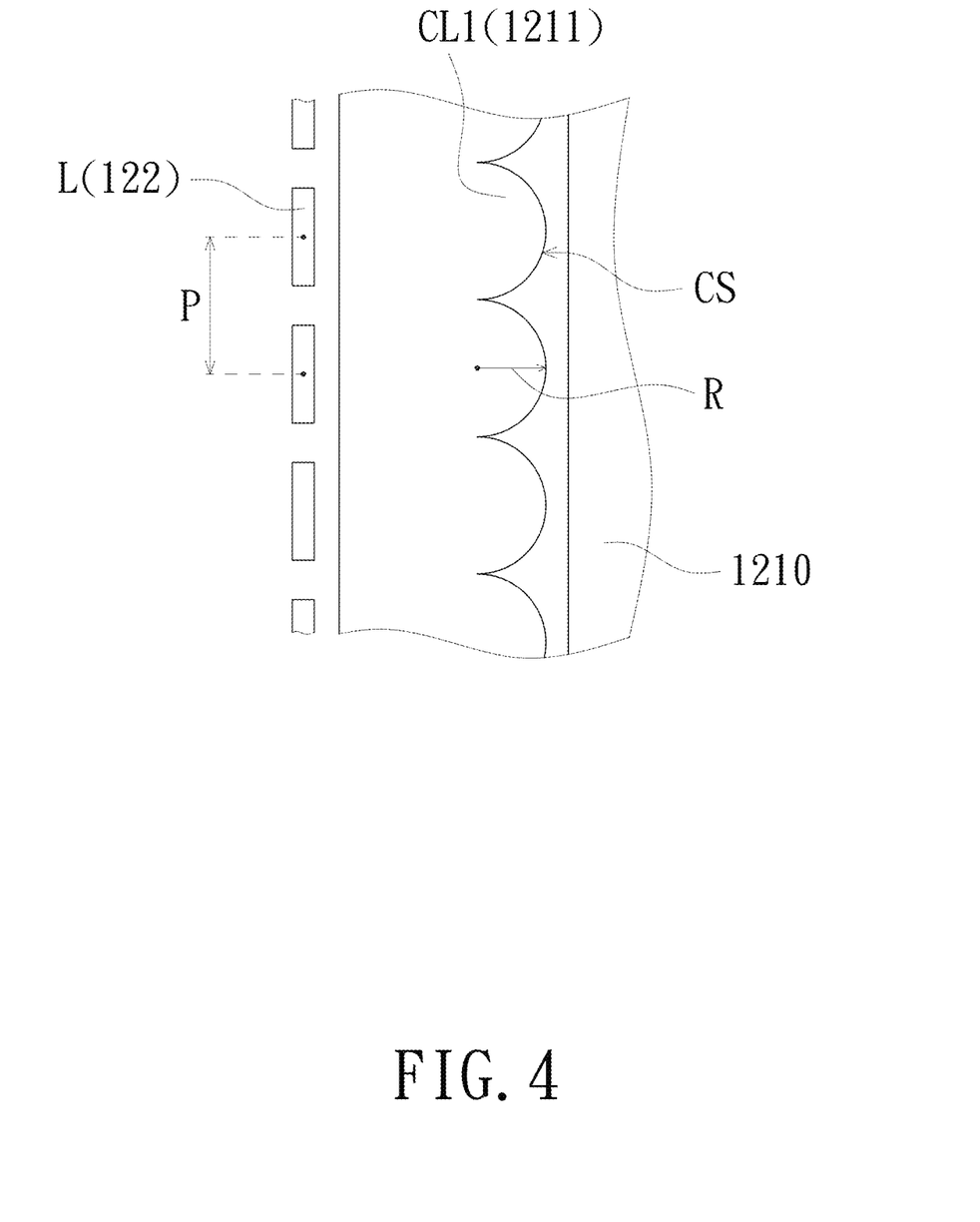
FIG. 4 is a partial enlarged schematic view of the first light source and the first condensing portion in FIG. 2.

FIG. 4 is a partial enlarged schematic view of the first light source and the first condensing portion in FIG. 2. Please refer to FIGS. 2 and 4 together. The first light source 122 and the second light source 123 each include a plurality of light emitting elements. FIG. 4 takes the light emitting elements L of the first light source 122 as an example, and the characteristics and advantages of the light emitting elements of the second light source 123 are the same as those of the light emitting elements L. Each light emitting element is configured to provide one of the plurality of beams. For example, each light emitting element L of the first light source 122 is configured to provide one of the beams B1 (shown in FIG. 1), and each light emitting element of the second light source 123 is configured to provide one of the beams B2 (shown in FIG. 1). In this embodiment, the light emitting elements L of the first light source 122 are configured for partial driving, and the light emitting elements of the second light source 123 are also configured for partial driving, for example. In this way, a part of the first light source 122 (or the second light source 123) can be selectively driven for light emission, so that the anti-peep beams PB1 and PB2 can be emitted from part of the light exit surface ES, thereby providing partial anti-peep effect to the display surface 111 and also reducing power consumption. Taking the first light source 122 as an example, some of the plurality of light emitting elements L can be configured to be driven together in this embodiment. However, each light emitting element L can be configured to be driven individually in another embodiment. The detailed process will be described in subsequent paragraphs. Incidentally, in this embodiment, the light emitting element L of the first light source 122 may include a light emitting diode (LED), and the light emitting element of the second light source 123 may also include a light emitting diode, but other embodiments are not limited thereto.

Refer to FIG. 1 again. The anti-peep module 120 of this embodiment can be fixed on the display module 110 by a frame (not shown), but the fixing methods of the anti-peep module 120 in other embodiments are not limited thereto. In this embodiment, the first condensing portion 1211 and the second condensing portion 1212 can condense the beams B1 and B2 respectively, so that the beams B1 and B2 are converged into the anti-peep beams PB1 and PB2 with the beam angle BA (shown in FIG. 3) less than 10 degrees. Thus, the luminance of the anti-peep beams PB1 and PB2 is increased and a good anti-peep effect can be provided by the anti-peep display device 100. Please refer to FIGS. 2 and 4 together again. The first condensing portion 1211 and the second condensing portion 1212 of the light guide assembly 121 may each include a plurality of condensing lenses. For example, the first condensing portion 1211 may include a plurality of condensing lenses CL1 (also shown in FIG. 3) formed by cutting out from the light guide plate 1210, and the second condensing portion 1212 may include a plurality of condensing lenses CL2 (shown in FIG. 2) formed by cutting out from the light guide plate 1210. The light emitting elements are disposed corresponding to the condensing lens, respectively. FIG. 4 takes the light emitting elements L of the first light source 122 being disposed corresponding to the condensing lenses CL1 as an example, and the relative positions of the light emitting elements of the second light source 123 and the condensing lenses CL2 are substantially the same as those of the light emitting elements L and the condensing lenses CL1. Specifically, the light emitting element L of the first light source 122 can be arranged one-to-one with the condensing lens CL1 to ensure that the beam B1 (shown in FIG. 1) can pass through the condensing lens CL1 to form the anti-peep beam PB1 (shown in FIG. 1). Similarly, as shown in FIG. 2, the light emitting element of the second light source 123 can be arranged one-to-one with the condensing lens CL2 to ensure that the beam B2 (shown in FIG. 1) can pass through the condensing lens CL2 to form the anti-peep beam PB2 (shown in FIG. 1). Referring to FIG. 4 again, furthermore, the condensing lens CL1 may include a condensing arc surface CS, and the condensing arc surface CS protrudes toward the light guide plate 1210. The curvature of each condensing arc surface CS is $1/R$, and the distance between two adjacent light emitting elements L is P, wherein $1/R \leq 2/P$. The aforementioned P is, for example, the distance between the respective center points of two adjacent light emitting elements L. In this way, the condensing effect of each condensing lens CL1 can be further improved. It can be understood that the condensing lens CL2 may also include a condensing arc surface, and the structure and advantages of the condensing arc surface are substantially the same as those of the condensing arc surface CS.

Refer to FIGS. 2 and 4 together again. The condensing lenses CL1 and CL2 may include plano-convex lenses. Specifically, the condensing lenses CL1 and CL2 of this embodiment may include plano-convex cylindrical lenses. In addition, taking the condensing lens CL1 in FIG. 4 as an example, the condensing arc surface CS may be the convex surface of the aforementioned plano-convex cylindrical lens. However, in an embodiment such as the anti-peep display device 100a shown in FIG. 5, the condensing lenses CL1a and CL2a of the light guide assembly 121a of the anti-peep module 120a can have a composite shape. For example, the condensing lenses CL1a and CL2a may each include connected plano-convex lens and cylindrical or cone-shaped lens. In another embodiment such as the anti-peep display device 100b shown in FIG. 6, in the light guide assembly 121b of the anti-peep module 120b, the condensing lens CL1b of the first condensing portion 1211b is disposed at an unequal distance from the first light source 122, and the condensing lens CL2b of the second condensing portion 1212b is disposed at an unequal distance from the second light source 123. Specifically, the distance between each condensing lens CL1b in the first condensing portion 1211b and the first light source 122 may be different according to design requirements, and the distance between each condensing lens CL2b in the second condensing portion 1212b and the second light source 123 may be different according to design requirements.

Refer to FIG. 2 again. In this embodiment, the first condensing portion 1211 can be connected to the second light incident surface S2 and has an integral structure with the light guide plate 1210; and the second condensing portion 1212 can be connected to the third light incident surface S3 and has an integral structure with the light guide plate 1210. In short, the light guide assembly 121 of this embodiment is an integral structure, so the light guide assembly 121 has the advantages of simple structure and can also simplify the assembly steps of the anti-peep display device 100, thereby reducing the cost. In detail, the first condensing portion 1211 and the second condensing portion 1212 can be formed by laser cutting, and at the same time the second light incident surface S2 and the third light incident surface S3 are formed on the light guide plate 1210. More specifically, the first condensing portion 1211 is formed between the second light incident surface S2 and the first light source 122, and the second condensing portion 1212 is formed between the third light incident surface S3 and the second light source 123. In this embodiment, the second light incident surface S2 is formed with, for example, a plurality of first ribs RP1 connected to the first condensing portion 1211. Similarly, the third light incident surface S3 is formed with, for example, a plurality of second ribs RP2 connected to the second condensing portion 1212. In this way, the first condensing portion 1211 and the second condensing portion 1212 forming excessively long gaps on both sides of the light guide plate 1210 can be prevented, thereby enhancing the structural strength on both sides of the light guide plate 1210. Each first rib RP1 and each second rib RP2 are, for example, arranged at equal distances, but the present invention is not limited thereto.

Figure 5:
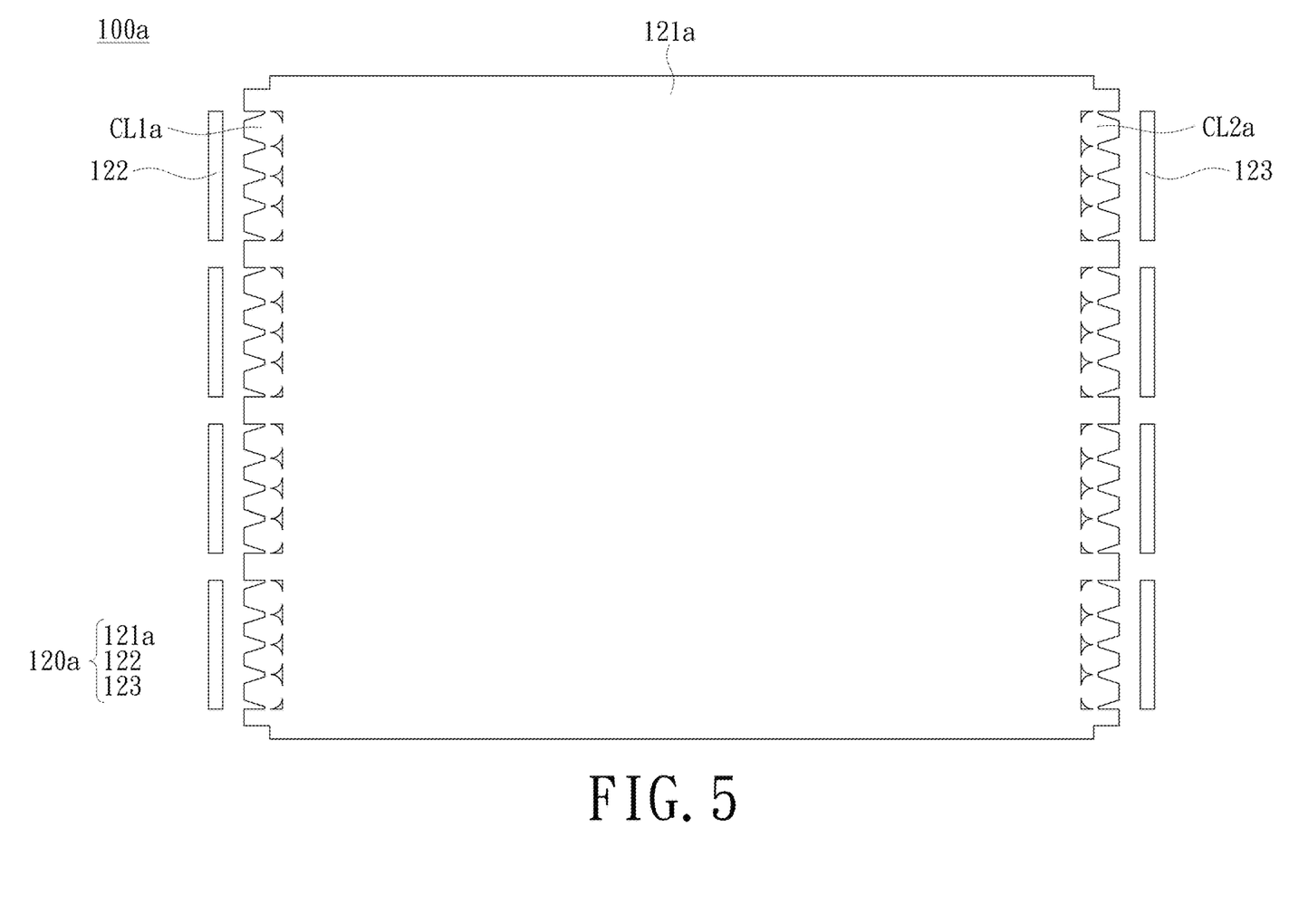
FIG. 5 is a schematic top view of an anti-peep module of an anti-peep display device according to another embodiment of the present invention.
Figure 6:
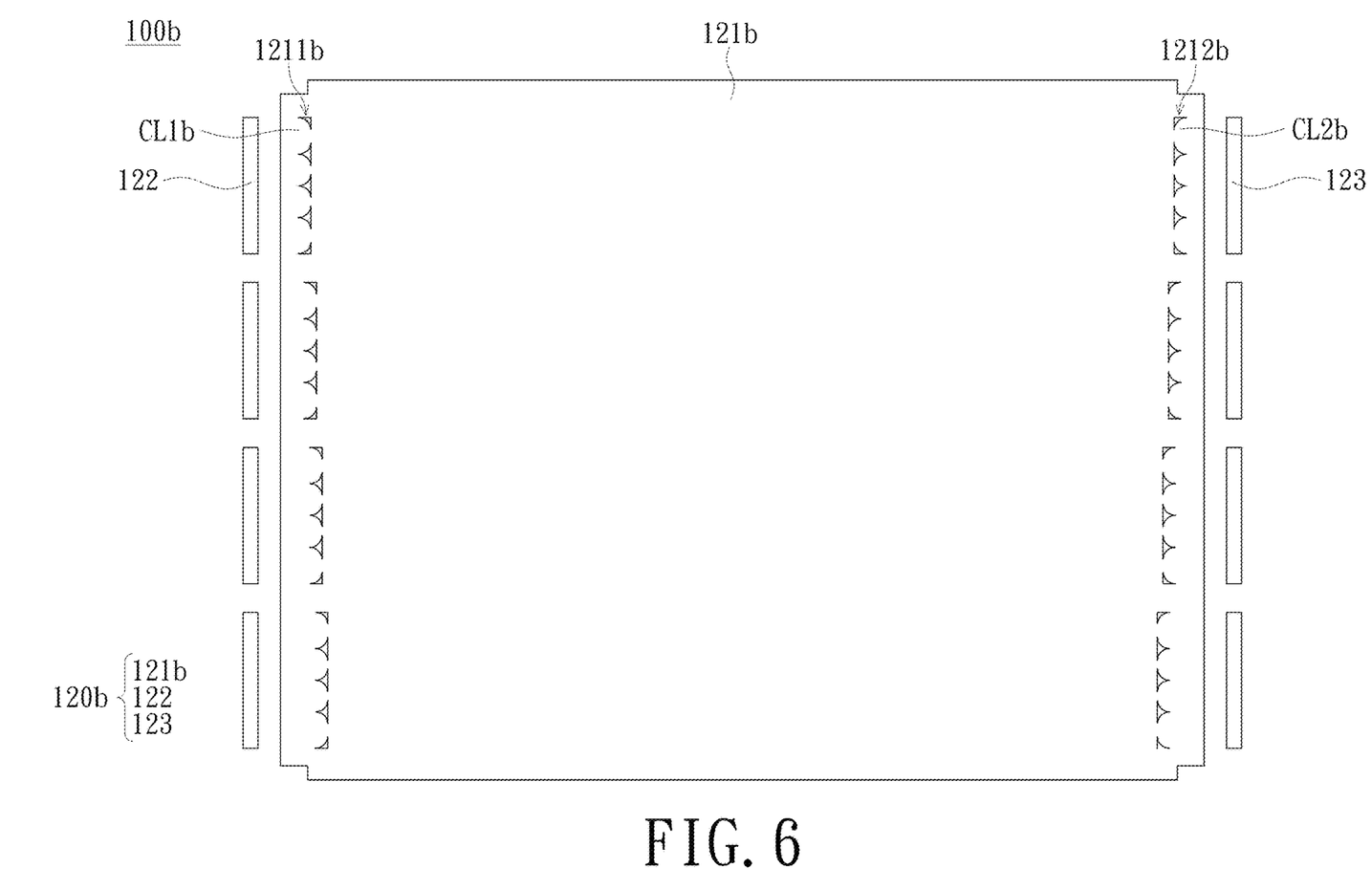
FIG. 6 is a schematic top view of an anti-peep module of an anti-peep display device according to another embodiment of the present invention.
Figure 7:
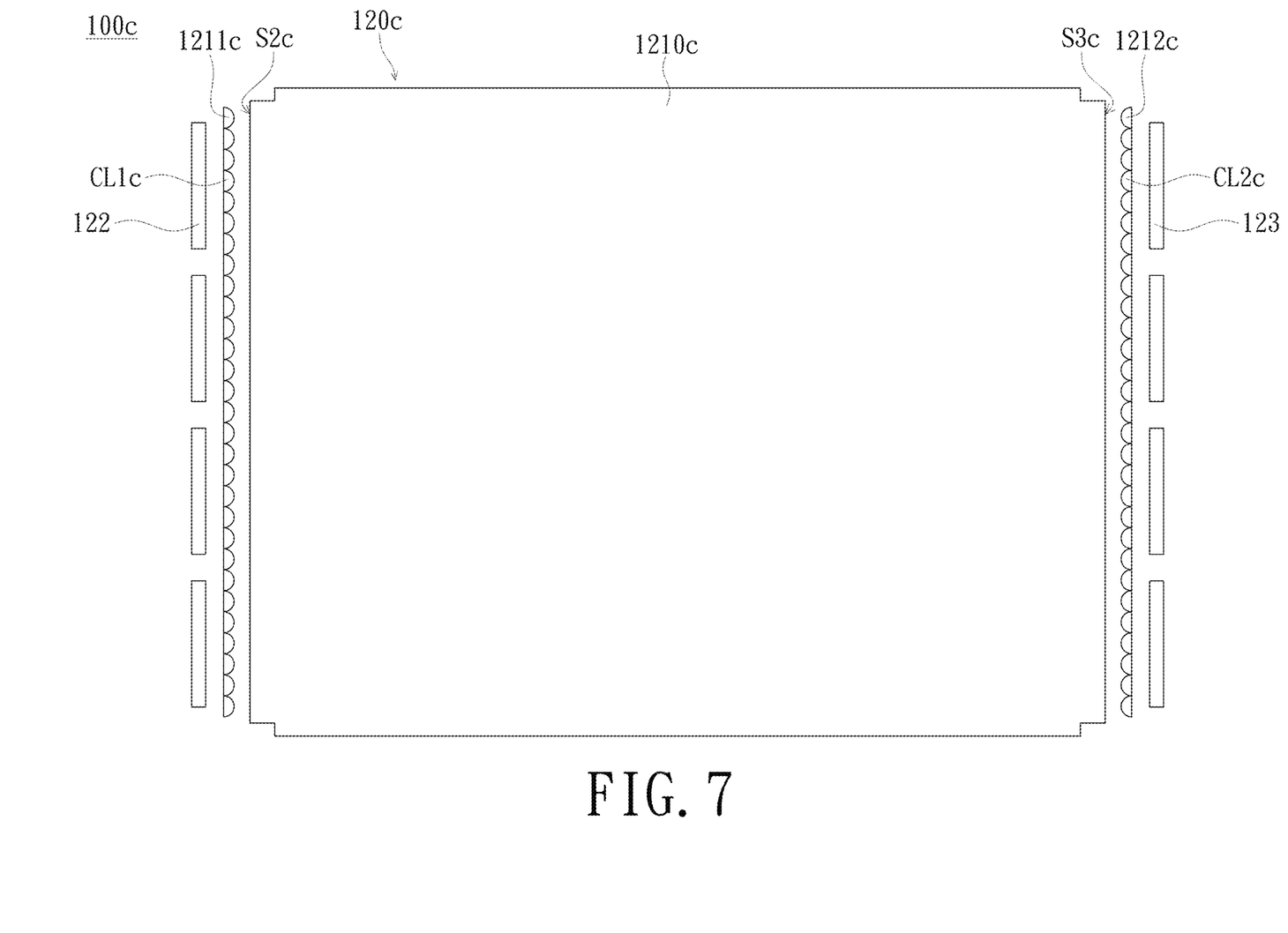
FIG. 7 is a schematic top view of an anti-peep module of an anti-peep display device according to another embodiment of the present invention.

It can be understood that the first condensing portion 1211, the second condensing portion 1212 and the light guide plate 1210 are not limited to an integral structure in other embodiments. For example, referring to the anti-peep display device 100c of FIG. 7, the first condensing portion 1211c, the second condensing portion 1212c and the light guide plate 1210c may have a separated structure. The first light source 122 is disposed corresponding to the second light incident surface S2c, and the first condensing portion 1211c is located between the first light source 122 and the second light incident surface S2c. The second light source 123 is disposed corresponding to the third light incident surface S3c, and the second condensing portion 1212c is located between the second light source 123 and the third light incident surface S3c. In this way, the light condensing effect of the first condensing portion 1211c and the second condensing portion 1212c can be further improved. Incidentally, the condensing lens CL1c of the first condensing portion 1211c and the condensing lens CL2c of the second condensing portion 1212c are not limited to the shapes shown in FIG. 7. For example, the condensing lenses CL1c and CL2c may have a composite shape as shown in FIG. 5, and may also be arranged at unequal distances from the first light source 122 and the second light source 123 respectively as shown in FIG. 6, and no redundant detail is to be given herein.

Figure 8:
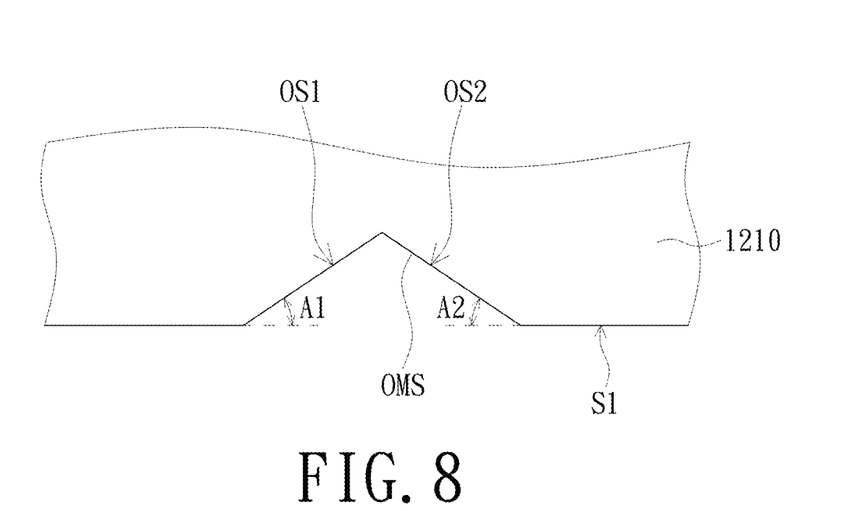
FIG. 8 is an enlarged schematic view of the optical microstructure of the light guide plate in FIG. 1.

FIG. 8 is an enlarged schematic view of the optical microstructure of the light guide plate in FIG. 1. Please refer to FIGS. 1 and 8 together. The material of the light guide plate 1210 may include polycarbonate (PC), polymethyl methacrylate (PMMA), glass or other resin materials with high light transmittance etc., but the present invention is not limited thereto. The optical microstructure OMS of this embodiment is formed by, for example, thermoforming the light guide plate 1210, and the shape of the optical microstructure OMS may include triangular pillars, cones, or triangular pyramids, but the present invention does not limit the specific shape. In this embodiment, after the anti-peep beams PB1 and PB2 are incident into the light guide plate 1210, part of the anti-peep beams PB1 and PB2 can be reflected (total reflection) by the optical microstructure OMS to the light exit surface ES and then exits from the light exit surface ES at an angle deviating from the forward light output. In detail, each optical microstructure OMS may have a first optical surface OS1 and a second optical surface OS2. The first optical surface OS1 faces the second light incident surface S2, and the second optical surface OS2 faces the third light incident surface S3. The angle A1 (labeled in FIG. 8) between the first optical surface OS1 and the first light incident surface S1 is between 25 and 45 degrees, and the angle A2 (labeled in FIG. 8) between the second optical surface OS2 and the first light incident surface S1 is between 25 and 45 degrees, wherein the values of the angles A1 and A2 are, for example, approximately the same. Specifically, the angle A1 between the first optical surface OS1 and the first light incident surface S1 refers to the acute angle between the first optical surface OS1 and the virtual extension surface of the first light incident surface S1; and the angle A2 between the second optical surface OS2 and the first light incident surface S1 refers to the acute angle between the second optical surface OS2 and the virtual extension surface of the first light incident surface S1. In this way, the anti-peep beams PB1 and PB2 can be emitted from the light exit surface ES at an angle between 20 and 60 degrees, thereby reducing the viewing angle of the display surface 111 and preventing interference with the forward light output of the display surface 111.

Compared with the prior art, the anti-peep module 120 of the anti-peep display device 100 in this embodiment adopts the first light source 122 and the second light source 123 to generate the beams B1 and B2, and adopts the first condensing portion 1211 and the second condensing portion 1212 to convert the beams B1 and B2 into the anti-peep beams PB1 and PB2, respectively. Furthermore, the anti-peep beams PB1 and PB2 overlap with a part of the display beam DB (e.g., the display beam DB with a large light-emitting angle) generated by the display surface 111, and the luminance of the anti-peep beams PB1 and PB2 is greater than that of the display beam DB. Therefore, the display beam DB with a large light-emitting angle cannot be clearly seen due to the influence of the anti-peep beams PB1 and PB2, thereby providing the anti-peep function. In addition, the anti-peep display device 100 of this embodiment achieves the anti-peep function by the anti-peep beams PB1 and PB2 overlapping the display beam DB with a large light-emitting angle; thus, the luminance of the display surface 111 in the forward viewing direction will not be reduced, and therefore the image quality of the anti-peep display device 100 can be maintained.

Figure 9:
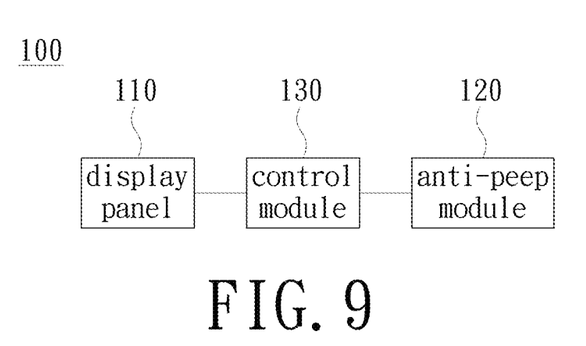
FIG. 9 is a schematic block diagram of the anti-peep display device of FIG. 1.
Figure 10:
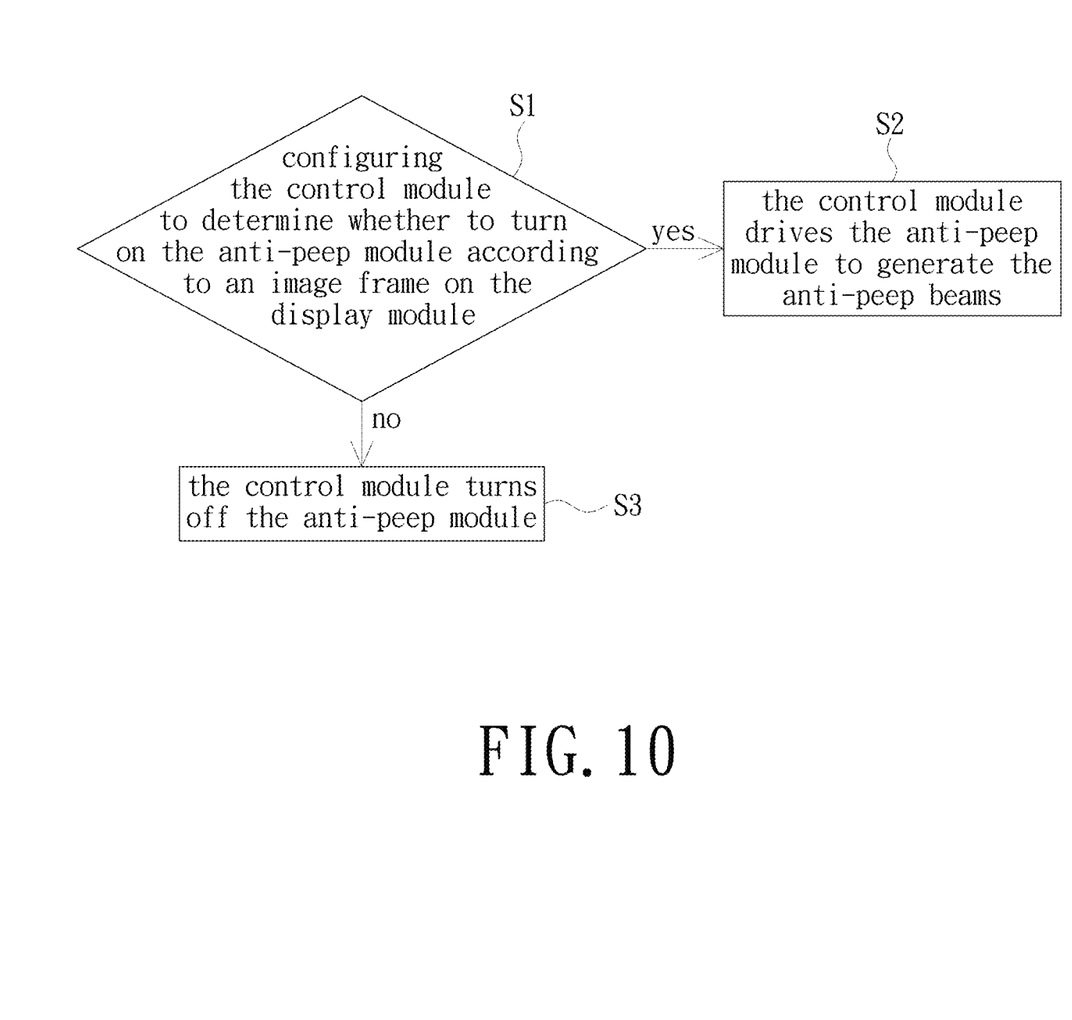
FIG. 10 is a schematic flowchart of an anti-peep method applicable to the anti-peep display device of FIG. 9.
Figure 11:
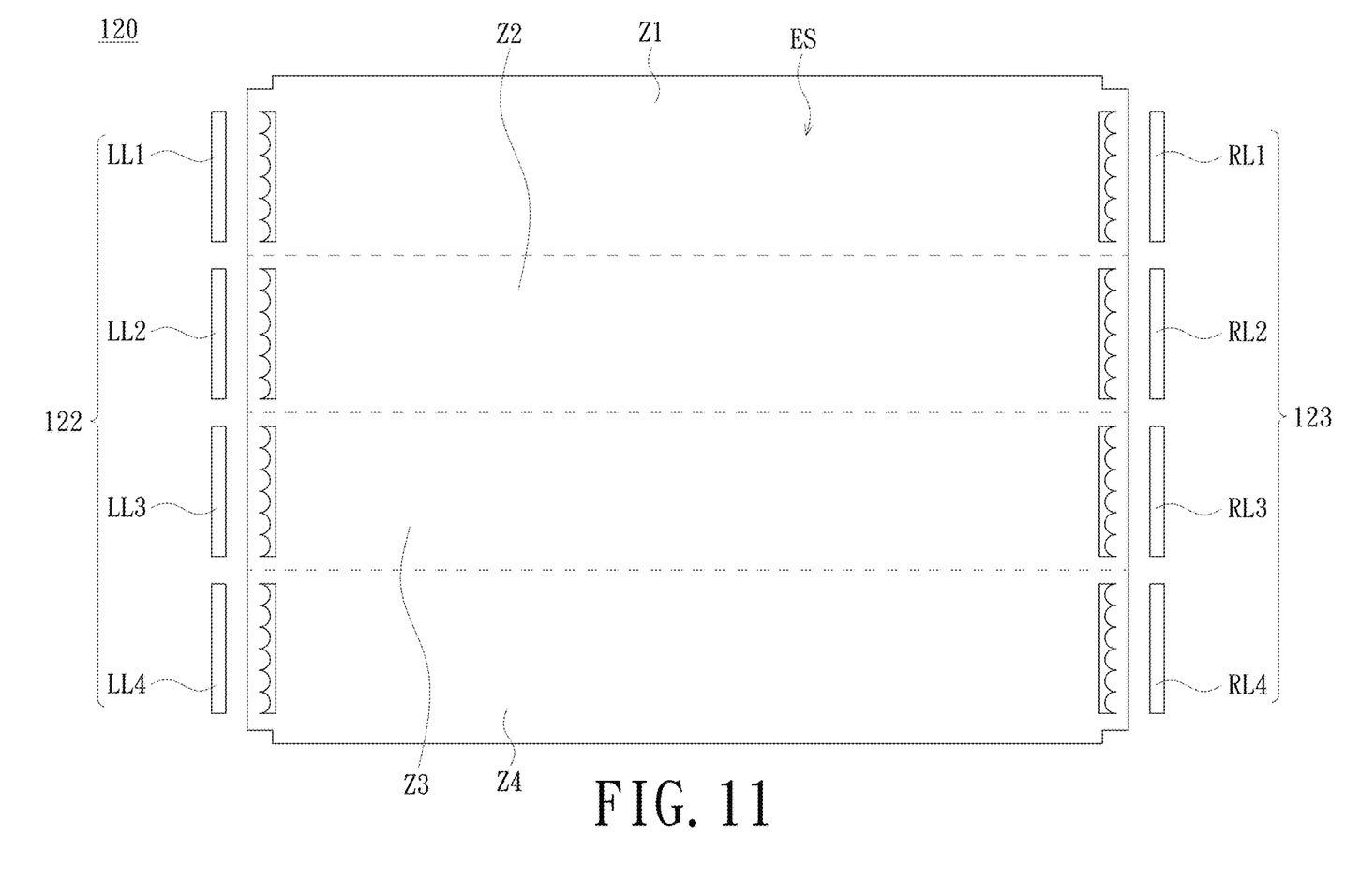
FIGS. 11 and 12 are schematic views illustrating that the anti-peep display device of FIG. 9 performs partial anti-peep.
Figure 12:
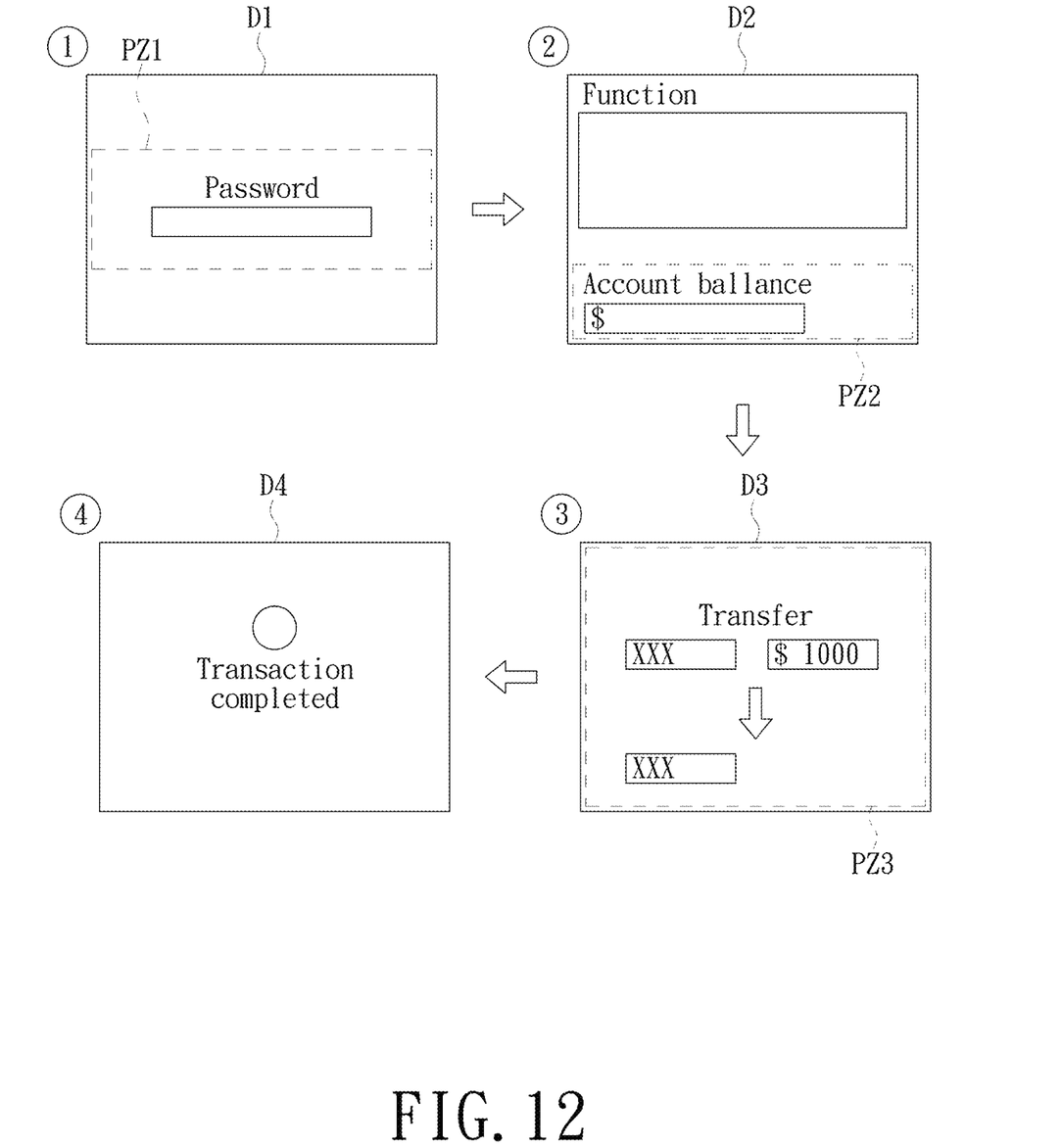

FIG. 9 is a schematic block diagram of the anti-peep display device of FIG. 1. FIG. 10 is a schematic flowchart of an anti-peep method applicable to the anti-peep display device of FIG. 9. FIGS. 11 and 12 are schematic views illustrating that the anti-peep display device of FIG. 9 performs partial anti-peep. Please refer to FIGS. 9 and 10 first. The anti-peep method is applicable to the anti-peep display devices 100, 100a, 100b and 100c, wherein this embodiment takes the anti-peep display device 100 as an example. It should be noted that the anti-peep display device 100 may further include a control module 130. The control module 130 is electrically connected to the display module 110 and the anti-peep module 120 and is configured to execute the aforementioned anti-peep method. The anti-peep method includes the following steps. Step S1: configuring the control module 130 to determine whether to turn on the anti-peep module 120 according to the image frame displayed on the display module 110. Specifically, the control module 130 can determine whether the image frame of the display module 110 includes an anti-peep zone, wherein the anti-peep zone is, for example, an area on which privacy information is displayed on the image frame. For example, referring to FIG. 12, the image frames D1, D2 and D3 respectively include anti-peep zones PZ1, PZ2 and PZ3, while the image frame D4 does not include an anti-peep zone. Please refer to FIGS. 9 and 10 again. The control module 130 may include a central processing unit (CPU, not shown) or a microcontroller (MCU, not shown), etc., but the present invention is not limited thereto. In this embodiment, step S2 is performed when the image frame includes an anti-peep zone. Step S2: configuring the control module 130 to drive the anti-peep module 120 to generate an anti-peep beam. The features of the aforementioned anti-peep beam have been described above, and no redundant detail is to be given herein. Alternatively, step S3 is performed when the image frame does not include an anti-peep zone. Step S3: configuring the control module 130 to turn off the anti-peep module 120. For example, referring to FIG. 12 again, there is no privacy information on the image frame D4, so the image frame D4 does not include the anti-peep zone. In this case, the anti-peep module 120 does not need to generate the aforementioned anti-peep beam.

Please refer to FIGS. 9, 11 and 12 together to further understand the details of step S2. As mentioned above, the first light source 122 and the second light source 123 may each include a plurality of light emitting elements. Specifically, in FIG. 11, the light emitting elements of the first light source 122 may be divided into four groups of light emitting elements LL1, LL2, LL3 and LL4; and the light emitting elements of the second light sources 123 may be divided into four groups of light emitting elements RL1, RL2, RL3 and RL4, wherein the light emitting elements RL1, RL2, RL3 and RL4 correspond to the light emitting elements LL1, LL2, LL3 and LL4, respectively. The control module 130 is configured to drive at least part of the light emitting elements of the first light source 122 and the second light source 123 according to the positions of the anti-peep zone (e.g., anti-peep zone PZ1, PZ2 and PZ3 in FIG. 12) in the image frame (e.g., image frame D1, D2 and D3 in FIG. 12), so that the aforementioned anti-peep beams are emitted from the blocks Z1, Z2, Z3 and/or Z4 of the light exit surface ES overlapping the anti-peep zones, thereby providing the display module 110 with a partial anti-peep function. For example, the position of the anti-peep zone PZ1 on the image frame D1 substantially overlaps the blocks Z2 and Z3 of the light exit surface ES, so the control module 130 can drive the two groups of light emitting elements LL2 and LL3 of the first light source 122 and the two groups of light emitting elements RL2 and RL3 of the second light source 123 to generate the anti-peep beams which exit from the blocks Z2 and Z3. Similarly, the position of the anti-peep zone PZ3 on the image frame D2 substantially overlaps the block Z4 of the light exit surface ES, so the control module 130 can drive the group of light emitting elements LL4 of the first light source 122 and the group of light emitting elements RL4 of the second light source 123 to generate the anti-peep beams which exit from the block Z4.

On the other hand, the control module 130 drives all the light emitting elements when the image frame includes the anti-peep zone. For example, the anti-peep zone PZ3 covers the entire image frame D3, so the control module 130 can drive the four groups of light emitting elements LL1, LL2, LL3 and LL4 of the first light source 122 and the four groups of light emitting elements RL1, RL2, RL3 and RL4 of the second light source 123 to generate the anti-peep beams which exit from the entire light emitting surface ES (i.e., all the blocks Z1, Z2, Z3 and Z4).

Compared with the prior art, the control module 130 in the anti-peep method of this embodiment can automatically determine whether to turn on the anti-peep module 120 according to the image frame displayed on the display module 110, so the convenience of use of the anti-peep module 120 can be improved. In addition, the anti-peep method of this embodiment can also provide a partial anti-peep function for the image frame of the display module 110, so power consumption is reduced and the convenience of use is further improved.

In summary, in the embodiments of the present invention, the anti-peep module of the anti-peep display device adopts the first light source and the second light source to generate the beams, and adopts the first condensing portion and the second condensing portion to convert the beams into the anti-peep beams, respectively. Furthermore, the anti-peep beams overlap with a part of the display beam (e.g., the display beam with a large light-emitting angle) generated by the display surface, and the luminance of the anti-peep beams is greater than that of the display beam. Therefore, the display beam with a large light-emitting angle cannot be clearly seen due to the influence of the anti-peep beams, thereby providing the anti-peep function. In addition, the anti-peep display device of the present invention achieves the anti-peep function by the anti-peep beams overlapping the display beam with a large light-emitting angle; thus, the luminance of the display surface will not be reduced, and therefore the image quality of the anti-peep display device can be maintained. In the anti-peep method of the present invention, the control module can automatically determine whether to turn on the anti-peep module according to the image frame displayed on the display module, so the convenience of use of the anti-peep module can be improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first condensing portion, the second condensing portion, the first light incident surface, the second light incident surface, the third light incident surface, the first light source, the second light source, the first rib, the second rib, the first optical surface and the second optical surface are only used for distinguishing various elements and do not limit the number of the elements.

What is claimed is:

1. An anti-peep display device, comprising:
a display module, having a display surface; and
an anti-peep module, disposed on the display surface and comprising:
a light guide assembly, comprising a light guide plate, a first condensing portion and a second condensing portion, wherein the light guide plate is disposed on the display surface, the light guide plate has a first light incident surface, a second light incident surface, a third light incident surface and a light exit surface, the first light incident surface faces the display surface and is opposite to the light exit surface, the second light incident surface and the third light incident surface are located between the first light incident surface and the light exit surface and are disposed on opposite sides, the first light incident surface is formed with a plurality of optical microstructures, the first condensing portion is disposed corresponding to the second light incident surface, and the second condensing portion is disposed corresponding to the third light incident surface; and
a first light source and a second light source, respectively disposed corresponding to the first condensing portion and the second condensing portion, wherein the first condensing portion and the second condensing portion are configured to convert a plurality of beams provided by the first light source and the second light source into a plurality of anti-peep beams with a beam angle less than 10 degrees, the optical microstructures are configured to reflect the anti-peep beams to the light exit surface, the anti-peep beams are then emitted from the light exit surface, and a light-emitting angle of the anti-peep beams from the light exit surface is between 20 and 60 degrees.

2. The anti-peep display device according to claim 1, wherein the first condensing portion and the second condensing portion each comprise a plurality of condensing lenses, the first light source and the second light source each comprise a plurality of light emitting elements, each of the light emitting elements is configured to provide one of the beams, and the light emitting elements are disposed corresponding to the condensing lenses respectively.

3. The anti-peep display device according to claim 2, wherein the condensing lenses each comprise a condensing arc surface, the condensing arc surfaces protrude toward the light guide plate, a curvature of each of the condensing arc surfaces is 1/R, a distance between each two adjacent light emitting elements is P, and $1/R \leq 2/P$.

4. The anti-peep display device according to claim 2, wherein the light emitting elements of the first light source are configured for partial driving, and the light emitting elements of the second light source are configured for partial driving.

5. The anti-peep display device according to claim 1, wherein the first condensing portion, the second condensing portion and the light guide plate have a separated structure, the first light source is disposed corresponding to the second light incident surface, the first condensing portion is located between the first light source and the second light incident surface, the second light source is disposed corresponding to the third light incident surface, and the second condensing portion is located between the second light source and the third light incident surface.

6. The anti-peep display device according to claim 1, wherein the first condensing portion is connected to the second light incident surface and forms an integral structure with the light guide plate, and the second condensing portion is connected to the third light incident surface and forms an integral structure with the light guide plate.

7. The anti-peep display device according to claim 6, wherein the second light incident surface is formed with a plurality of first ribs, the first ribs are connected to the first condensing portion, the third light incident surface is formed with a plurality of second ribs, and the second ribs are connected to the second condensing portion.

8. The anti-peep display device according to claim 1, wherein the first condensing portion and the second condensing portion each comprise a plurality of condensing lenses, the condensing lenses of the first condensing portion are disposed at an unequal distance from the first light source, and the condensing lenses of the second condensing portion are disposed at an unequal distance from the second light source.

9. The anti-peep display device according to claim 1, wherein the first condensing portion and the second condensing portion each comprise a plurality of condensing lenses, and the condensing lenses comprise plano-convex lenses.

10. The anti-peep display device according to claim 1, wherein each of the optical microstructures has a first optical surface and a second optical surface, the first optical surface faces the second light incident surface, the second optical surface faces the third light incident surface, an angle between the first optical surface and the first light incident surface is between 25 and 45 degrees, and an angle between the second optical surface and the first light incident surface is between 25 and 45 degrees.

11. An anti-peep method applicable to the anti-peep display device, the anti-peep display device comprising a display module, an anti-peep module and a control module, the control module being electrically connected to the display module and the anti-peep module, the display module having a display surface, the anti-peep module being disposed on the display surface and comprising a light guide assembly, a first light source and a second light source, the light guide assembly comprising a light guide plate, a first condensing portion and a second condensing portion, the light guide plate being disposed on the display surface, the light guide plate having a first light incident surface, a second light incident surface, a third light incident surface and a light exit surface, the first light incident surface facing the display surface and being opposite to the light exit surface, the second light incident surface and the third light incident surface being located between the first light incident surface and the light exit surface and being disposed on opposite sides, the first light incident surface being formed with a plurality of optical microstructures, the first condensing portion being disposed corresponding to the second light incident surface, the second condensing portion being disposed corresponding to the third light incident surface, the first light source and the second light source being respectively disposed corresponding to the first condensing portion and the second condensing portion, the first condensing portion and the second condensing portion being configured to convert a plurality of beams provided by the first light source and the second light source into a plurality of anti-peep beams with a beam angle less than 10 degrees, the optical microstructures being configured to reflect the anti-peep beams to the light exit surface, the anti-peep beams being then emitted from the light exit surface, a light-emitting angle of the anti-peep beams from the light exit surface being between 20 and 60 degrees, and the anti-peep method comprising:

configuring the control module to determine whether to turn on the anti-peep module according to an image frame on the display module, wherein the control module drives the anti-peep module to generate the anti-peep beams when the image frame comprises an anti-peep zone, and the control module turns off the anti-peep module when the image frame does not comprise the anti-peep zone.

12. The anti-peep method according to claim 11, wherein the first light source and the second light source each comprise a plurality of light emitting elements, and the control module is configured to drive at least part of the light emitting elements of the first light source and the second light source according to a position of the anti-peep zone in the image frame, so that the anti-peep beams exit from a block of the light exit surface overlapping the anti-peep zone.

13. The anti-peep method according to claim 11, wherein the anti-peep module comprises a plurality of light emitting elements, and the control module is configured to drive all the light emitting elements when the image frame comprises the anti-peep zone.

* * * * *